United States Patent
Bertagna et al.

(10) Patent No.: US 11,796,081 B2
(45) Date of Patent: Oct. 24, 2023

(54) VALVE ASSEMBLY WITH HOLLOW BOLT FOR SECURITY WIRE

(71) Applicant: Watts Regulator Co., North Andover, MA (US)

(72) Inventors: Peter J. Bertagna, Moultonborough, NH (US); Ian D. Baynes, Merrimac, MA (US)

(73) Assignee: Watts Regulator Co., North Andover, MA (US)

( * ) Notice: Subject to any disclaimer, the term of this patent is extended or adjusted under 35 U.S.C. 154(b) by 0 days.

(21) Appl. No.: 17/078,573

(22) Filed: Oct. 23, 2020

(65) Prior Publication Data

US 2021/0131585 A1    May 6, 2021

Related U.S. Application Data

(60) Provisional application No. 62/927,841, filed on Oct. 30, 2019.

(51) Int. Cl.
*F16K 35/12* (2006.01)
*F16K 35/14* (2006.01)

(52) U.S. Cl.
CPC .............. *F16K 35/12* (2013.01); *F16K 35/14* (2013.01)

(58) Field of Classification Search
CPC ... F16L 23/003; F16L 2201/20; F16B 35/041; F16B 1/0071; F16B 41/005; F16K 35/14; F16K 35/12; F16K 27/00; F01D 25/243
USPC ..... 285/1, 368, 412, 386–389; 137/377–385, 137/613; 251/366; 411/479
See application file for complete search history.

(56) References Cited

U.S. PATENT DOCUMENTS

| | | | | |
|---|---|---|---|---|
| 1,365,477 A | * | 1/1921 | Salvadore ............. | G01F 15/007 292/307 A |
| 2,538,787 A | * | 1/1951 | Manhartsberger .... | F16K 31/465 137/556.3 |
| 3,422,840 A | * | 1/1969 | Brumm .................. | F16K 17/10 137/384 |
| 3,467,422 A | * | 9/1969 | Mielke .................. | F16C 11/045 403/11 |
| 5,070,712 A | | 12/1991 | Fox | |
| 5,116,178 A | * | 5/1992 | Lerman .................. | F16B 39/20 411/87 |
| 5,271,427 A | * | 12/1993 | Berchem ................ | B65G 53/52 137/375 |
| 5,365,757 A | | 11/1994 | Primeau et al. | |
| 5,468,103 A | * | 11/1995 | Leeson .................. | F16B 39/20 411/87 |
| 5,507,533 A | * | 4/1996 | Mumma ............... | F16L 55/005 285/902 |

(Continued)

*Primary Examiner* — Craig J Price
*Assistant Examiner* — Andrew J Rost
(74) *Attorney, Agent, or Firm* — Harris Beach PLLC

(57) ABSTRACT

A valve assembly having a bolt with a through hole for a security wire includes at least one valve of the valve assembly mechanically coupled to a pipe or to a section of another component of the valve assembly by a coupling or by a pair of mating flanges. At least one hollow bolt is bolted through a closing bolt hole of the coupling or a joining bolt hole of the pair of mating flanges. The at least one hollow bolt accepts a safety wire run completely through the hollow bolt in a longitudinal direction of the hollow bolt and extending completely through the closing bolt hole of the coupling or the joining bolt hole of the pair of mating flanges.

14 Claims, 5 Drawing Sheets

(56) References Cited

U.S. PATENT DOCUMENTS

| | | | |
|---|---|---|---|
| 5,881,582 A | 3/1999 | Monaco | |
| 5,948,128 A * | 9/1999 | Stavropoulos | F16T 1/34 55/466 |
| 6,135,509 A * | 10/2000 | Billington, III | F16L 15/08 285/316 |
| 6,652,006 B1 * | 11/2003 | Digiacomo | F16L 15/009 285/353 |
| 6,718,774 B2 * | 4/2004 | Razzell | F01D 25/243 60/753 |
| 7,037,065 B2 * | 5/2006 | Reigl | F01D 25/243 415/47 |
| 7,628,079 B2 * | 12/2009 | Sato | G01L 5/24 73/761 |
| RE42,304 E | 4/2011 | Frank et al. | |
| 8,635,894 B2 * | 1/2014 | Christ | F16B 35/041 72/88 |
| 8,997,536 B2 | 4/2015 | Fuller et al. | |
| 9,032,764 B2 | 5/2015 | Yeh | |
| 9,249,577 B2 * | 2/2016 | Ross | E04H 17/10 |
| 10,605,293 B1 * | 3/2020 | Sardo | F16B 35/041 |
| 2003/0062718 A1 * | 4/2003 | Radzik | F16L 17/04 285/94 |
| 2008/0100060 A1 * | 5/2008 | Hayashi | F16L 27/1012 285/148.8 |
| 2012/0317905 A1 * | 12/2012 | MacDuff | E04C 3/122 52/220.2 |

* cited by examiner

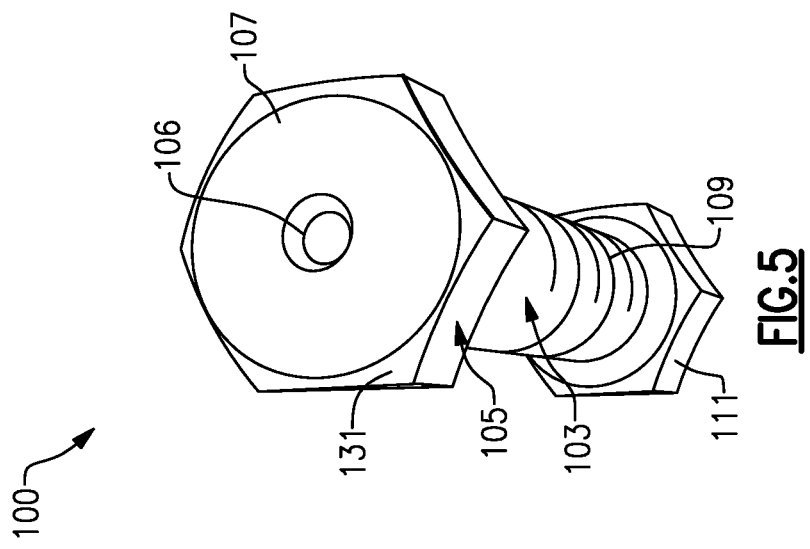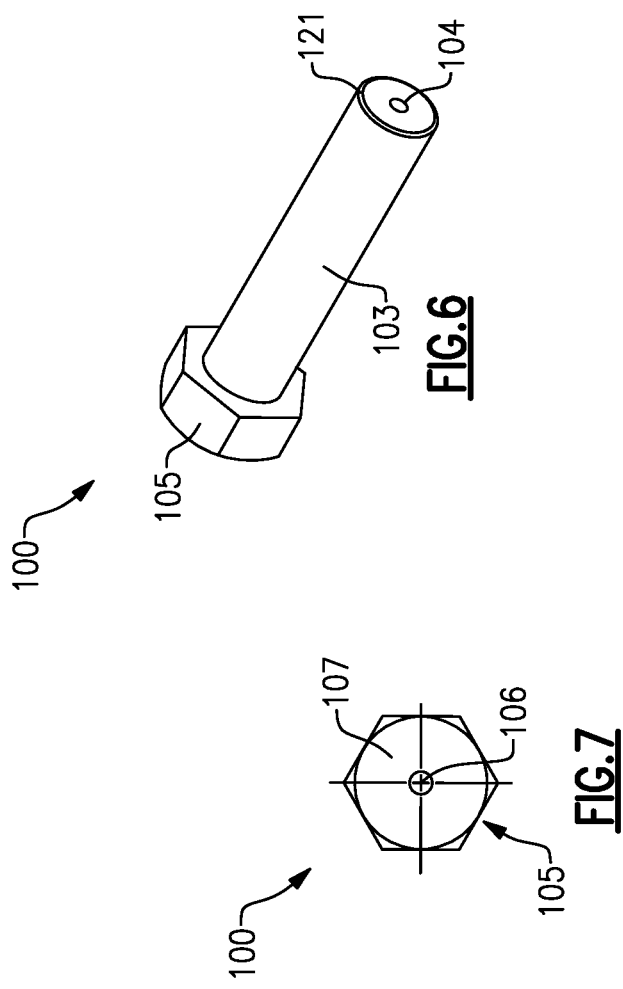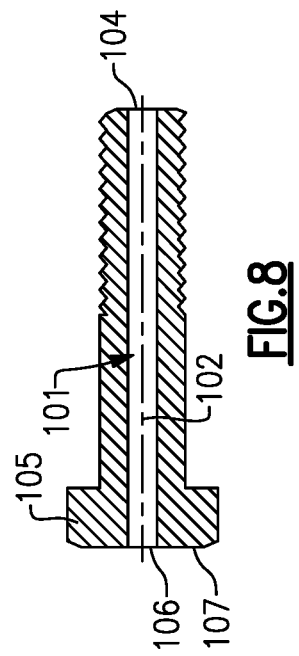

US 11,796,081 B2

1

VALVE ASSEMBLY WITH HOLLOW BOLT FOR SECURITY WIRE

CROSS-REFERENCE TO RELATED APPLICATIONS

This application claims priority to and the benefit of U.S. provisional patent application Ser. No. 62/927,841, VALVE ASSEMBLY WITH HOLLOW BOLT FOR SECURITY WIRE, filed Oct. 30, 2019, which application is incorporated herein by reference in its entirety.

FIELD OF THE APPLICATION

The application relates to valve assemblies, particularly to valve assemblies secured together with bolts and having security wires that pass through the bolts to prevent disassembly between inspections.

BACKGROUND

Industrial valve assemblies typically include flanges or grooved couplings for bolting components together or to connecting pipes.

Safety inspectors frequently drill small holes into flanges of assembled and installed valve assemblies to run a security wire to be tagged to indicate that the valve assembly has been inspected. The valve assembly may include, for example, backflow prevention valves, control valves, or pressure reducing valves. In some cases, the security wire and tag also act as a tamper indication if the wire is cut or if the tag is removed, indicating that the valve assembly may have been disabled or otherwise tampered with.

SUMMARY

A valve assembly having a bolt with a through hole for a security wire includes at least one valve of the valve assembly mechanically coupled to a pipe or to a section of another component of the valve assembly by a coupling or by a pair of mating flanges. At least one hollow bolt is bolted through a closing bolt hole of the coupling or a joining bolt hole of the pair of mating flanges. The at least one hollow bolt accepts a safety wire run completely through the hollow bolt in a longitudinal direction of the hollow bolt and extending completely through the closing bolt hole of the coupling or the joining bolt hole of the pair of mating flanges.

A first flange of the pair of mating flanges can include a valve flange and a second flange of the pair of mating flanges can include a pipe flange. A first flange of the pair of mating flanges can include a valve flange and a second flange of the pair of mating flanges can include a valve flange of another different valve. Any of the couplings can include a grooved coupling.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

2

Figure 1:
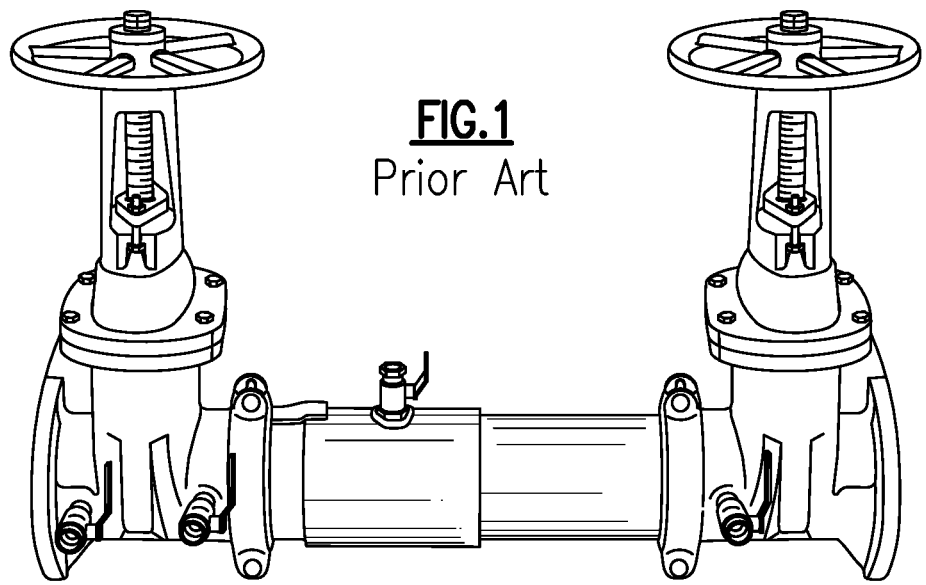
Figure 2:
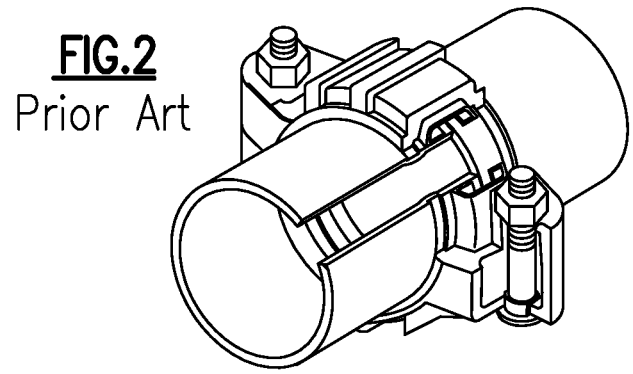
Figure 3:
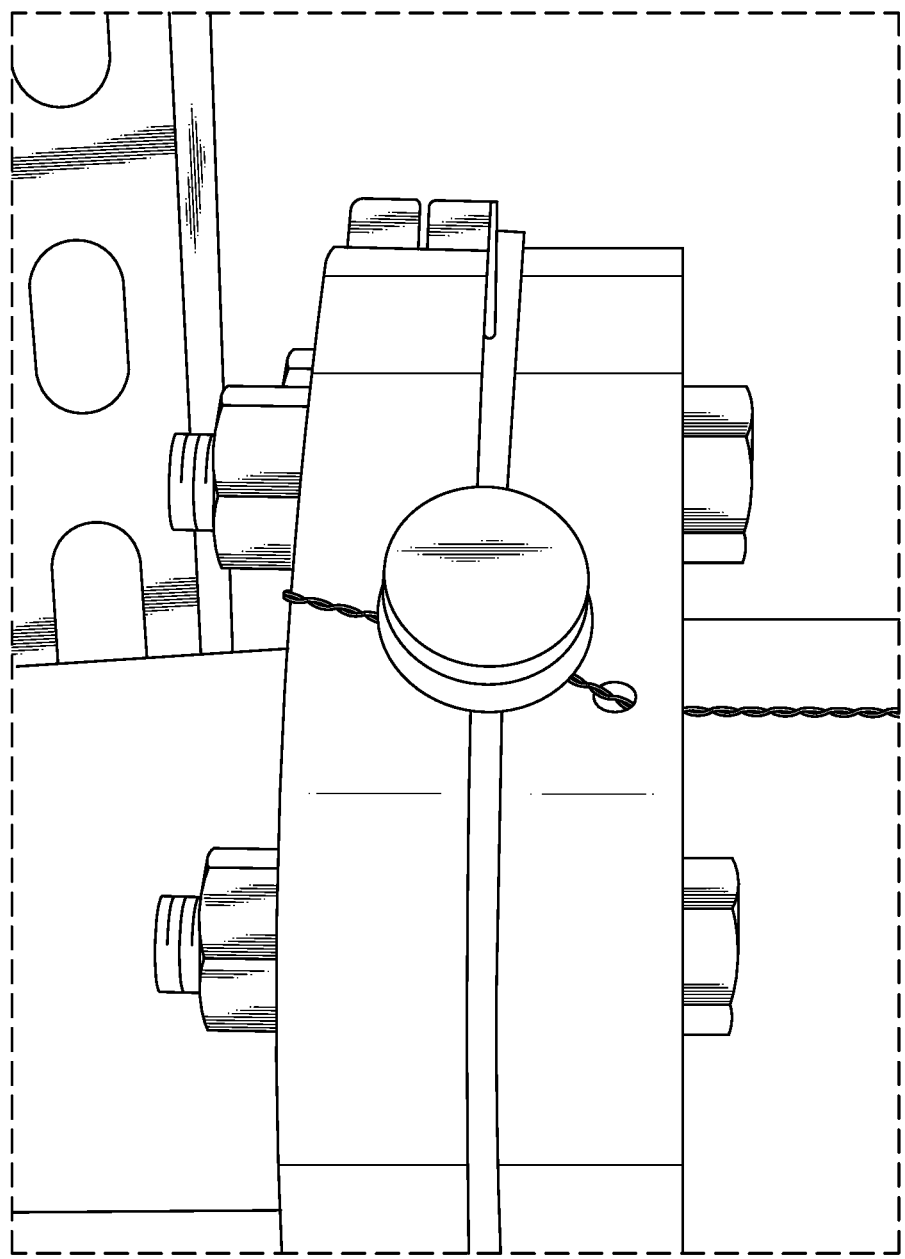
Figure 4:
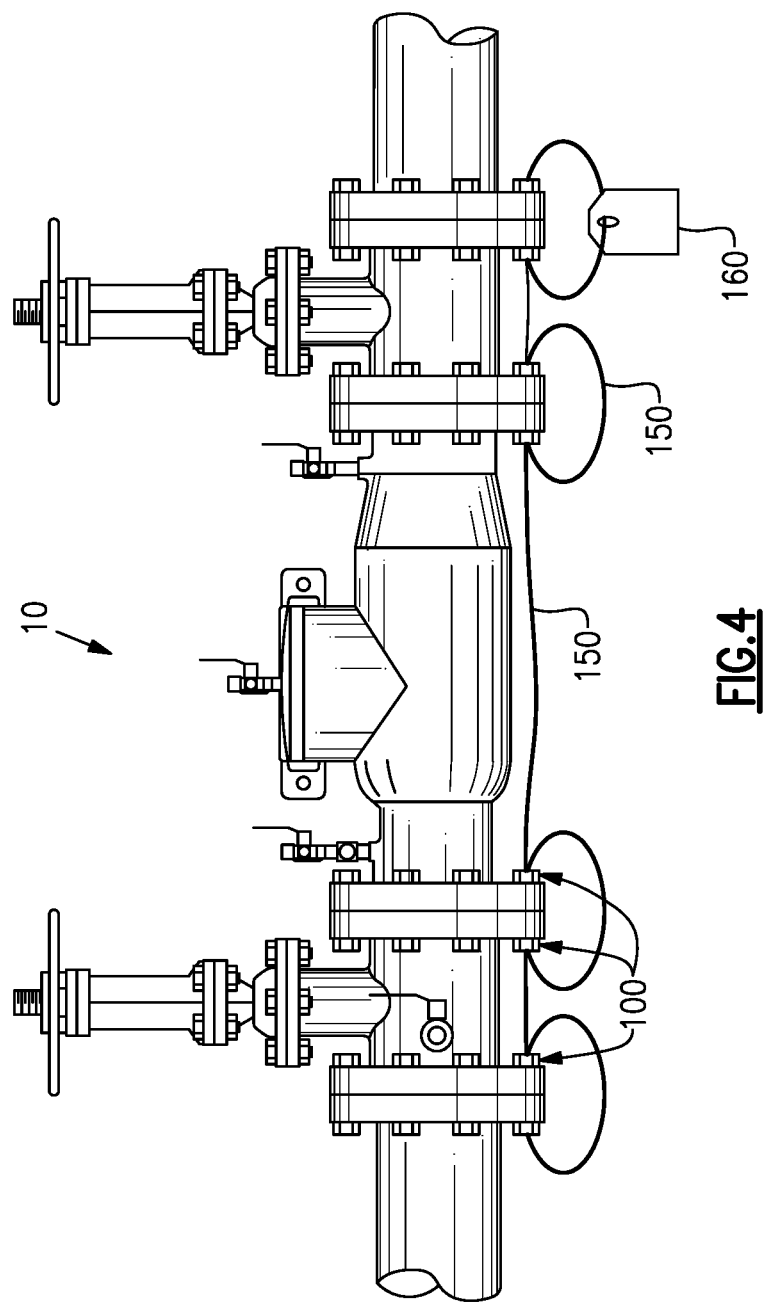

FIG. 1 is a drawing showing an exemplary valve assembly;

FIG. 2 is a drawing showing an exemplary grooved coupling of a valve assembly;

FIG. 3 is a drawing showing an example of an inspector drilled flange with a safety wire and inspection locking or crimp tag;

FIG. 4 is a drawing showing an exemplary assembled valve flange assembly inspection wired using a new type of flange bolt according to the Application;

FIG. 5 is a drawing illustrating an exemplary through hole hex hollow bolt according to the Application;

FIG. 6 is a drawing showing a simplified isometric view of the bolt of FIG. 5;

FIG. 7 is a drawing showing an end view of the bolt of FIG. 5;

FIG. 8 is a drawing showing a side cut away view of the bolt of FIG. 5; and

Figure 9:
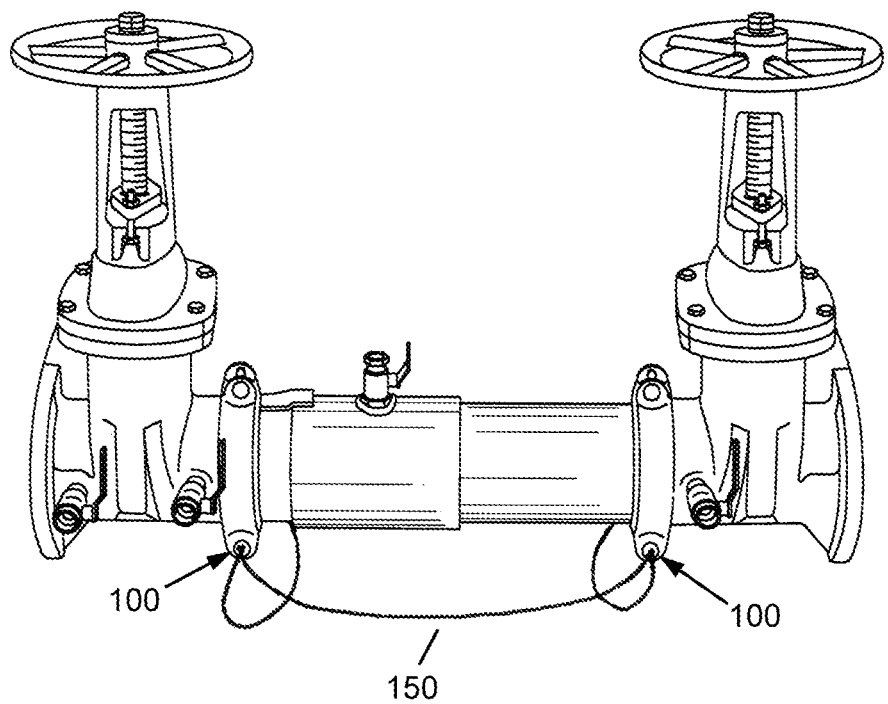

FIG. 9 is a drawing showing an exemplary assembled valve flange assembly using the grooved couplings of FIG. 1 and FIG. 2, with security wire using a new type of flange bolt according to the Application.

DETAILED DESCRIPTION

Industrial valve assemblies typically include flanges or grooved couplings for bolting components together or to connecting pipes. FIG. 1 is a drawing showing an exemplary valve assembly. FIG. 2 is a drawing showing an exemplary grooved coupling of a valve assembly.

In critical infrastructure, such as, for example, assembled valve flanges and/or couplings using relatively large diameter water or gas piping, are inspected after installation and before operational use.

Typically, following the inspection, such as by a municipal inspector, or water or gas company inspector, approved installations are marked in such a way that they cannot be disassembled or modified without breaking the inspection marking. Particularly in some jurisdictions, inspectors drill small holes through inspected pipe flanges, and then run safety or sealing wire through the holes and crimp on an inspection tag. Once so tagged, the only way to open the inspected flange connection is to cut the wire and/or to remove the crimped or tagged inspection part.

FIG. 3 shows an example of an inspector drilled flange with a safety wire and inspection locking or crimp tag.

One problem with such safety wiring is that no matter how small the hole drilled, the inspector drilled hole approach is not an optimal installation procedure to modify a manufactured flange. Another problem is that the hole is untreated (i.e. not painted) and may provide an additional point of corrosion. Yet another problem might be the introduction of corrosion caused by the dissimilar metals of the safety wire and the flange metal material.

FIG. 4 shows an exemplary system inspection wired using a new type of hollow flange bolt which has been manufactured with a through hole designed to pass security wire for inspection tagging. At least one bolt in every flange to be marked as inspected is of the new type of through hole bolt according to the Application as described in more detail hereinbelow. As shown in FIG. 4, the safety wire is run through each of the through hole bolts. The wire can be optionally looped at each pipe flange connection for a more definitive marking of each of the flanges. In the example, a tag is hung from the security wire. However, any suitable locking or crimped tamper proof seal can also be used to affix the security wire to give a more affirmative indication of tamper should any of the flanges be opened. Common valve flange assemblies as shown in FIG. 4 typically include a backflow valve.

Continuing with FIG. 4, in general, a valve assembly 10 has a hollow bolt 100 with through hole (FIG. 5, 106) for a security wire 150 which includes at least one valve of the valve assembly mechanically coupled to a pipe or to a section of another component of the valve assembly by a pair of mating flanges. At least one hollow bolt is bolted through a joining bolt hole of the pair of mating flanges. The at least one hollow bolt accepts a safety wire run completely through the hollow bolt in a longitudinal direction of the hollow bolt and extending completely through the joining bolt hole of the pair of mating flanges. There can be an inspector tag 160 and/or a temper resistant seal or crimp. While the exemplary valve assembly of FIG. 4 uses mating flanges, any or all of the flanges can be any suitable coupling with a coupling closing hole, such as, for example a grooved coupling, such as the exemplary grooved coupling of FIG. 2. Where a coupling is used in place of a pair of flanges, the hollow bolt can be installed through any suitable closing hole of the coupling.

FIG. 5 is a drawing illustrating an exemplary through hole hex bolt 100 according to the Application. The bolt shaft 103 defines a longitudinal axis 102, FIG. 2, of the through hole bolt 100. A longitudinal hollow 101 with a first end 106 opening continues as a through hole completely through the bolt shaft 103 in the longitudinal axis 102 (FIG. 8) direction. A bolt head 105 is at one end of the bolt shaft 103. A hole at the second end 104 of the longitudinal hollow 101 runs through an end surface face 107 of the bolt head 105. The hole at the second end 106 of the longitudinal hollow 101 is located at about a center of the end surface face 107. The hole at the second end 106 is disposed in line with the longitudinal axis 102 and contiguous with the longitudinal hollow 101 through hole running through the bolt shaft 103, from the first end 104 to the second end 106 of the hollow through the bolt 100. In many applications the new hollow bolt, such as the through hole bolt of FIG. 5, can be manufactured from any suitable stainless-steel material to minimize the risk of corrosion.

There can also be optional bevels, such as bevel 121, FIG. 6 at the end of shaft 103. There can also optionally be a bevel 131, FIG. 5 on the end surface face 107.

Most through hole bolt 100 will include some length of any suitable screw or bolt thread 109. The pitch, length and/or other parameters of the thread 109 are unimportant to a through hole bolt 100 according to the Application. Nut 11, FIG. 5 is merely shown for completeness. Any nut 111 suitable to the thread 109 can be used.

In summary, and with reference to FIG. 5 to FIG. 8, one exemplary through hole bolt 100 for safety wire inspection marking of valve flanges includes a bolt shaft 103 defining a longitudinal axis 102 of the through hole bolt 100. A longitudinal hollow runs as a through hole 101 completely through the bolt shaft 103 and bolt head 105 in the longitudinal direction. The bolt head 105 is at one end 106 of the bolt shaft 103. A hole through an end surface face 107 of the bolt head 105 is located at about a center of the end surface face 107 and disposed in line with the longitudinal axis 102 and contiguous with the longitudinal hollow through hole 101.

Note that conventional safety wired bolts of the prior art (e.g. as are typically used in many aircraft applications) provide holes either through a head of the bolt and/or through the shaft of the bolt about perpendicular to a long axis of the bolt. Applicant realized a different direction to the common wisdom of the traditional safety wired, safety bolt, where the through hole is a longitudinal hollow which runs the length of the bolt from shaft end first opening 104 to bolt end second opening 106, in the same direction as the long or longitudinal axis 102 of the new through hole bolt 100. Thus, the safety wire not only passes through the entire length of the hollow through hole bolt, but also entirely through the bolt hole in which the hollow through hole bolt has been installed.

FIG. 6 is a drawing showing a simplified isometric view the through hole hex bolt of FIG. 5 without showing threads but showing the center hole.

FIG. 7 is a drawing showing an end view (second end) of the through hole hex bolt of FIG. 5.

FIG. 8 is a side cut away view of the through hole hex bolt of FIG. 5.

Some valve assembly installations may interchangeably refer to the new hollow bolt of the Application as a through hole bolt, a hollow through hole bolt, a hollow valve flange bolt, etc., such as, can be used for safety wiring. Hollow bolts 100 according to the application can be made in any suitable size, shape, and length for use with any suitable valve, pipe, or other valve assembly couplings or flanges. Valve assemblies can include any suitable combination of valves, pipes, other valve assembly components, and combinations thereof. Valve assemblies can include one or more, and combinations of any suitable flanges, suitable couplings, and combinations thereof. At least one or more of the flanges or couplings includes a bolt hole for joining or closing a coupling which is suitable to accept at least one hollow bolt according to the Application.

A portion or all of the valve assembly can be inspected in the factory and shipped with the safety wire installed and optionally tagged, crimped, sealed, and any combination thereof. More typically, the safety wire can be installed on-site following installation of the valve assembly. Safety wire for later use can be optionally packed and sold with the valve assembly. Or, the safety wire can be provided later on site, by the installer, owner, inspector, etc., as is custom, law, permitted, and/or protocol in any particular jurisdiction. There can also be used a cable, or cable with cable lock, similarly run through one or more hollow bolts 100.

FIG. 9 is a drawing showing an exemplary assembled valve flange assembly using the grooved couplings of FIG. 1 and FIG. 2, with a security wire 150 using a new type of flange bolt 100 according to the Application.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A valve assembly comprising:
   at least one valve of said valve assembly mechanically coupled to a pipe or to a section of another component of said valve assembly by a coupling or by a pair of mating flanges;
   at least one hollow bolt comprising an unobstructed through hole, said at least one hollow bolt bolted through a closing bolt hole of said coupling or a joining bolt hole of said pair of mating flanges, said at least one hollow bolt to slidingly accept a safety wire run completely through said at least one hollow bolt in a longitudinal direction of said hollow bolt and extending completely through said closing bolt hole of said coupling or said joining bolt hole of said pair of mating flanges, the safety wire to extend beyond both longitudinal ends of said at least one hollow bolt; and a non-taut safety wire passing freely through said unobstructed through hole.

2. The valve assembly of claim 1, wherein a first flange of said pair of mating flanges comprises a valve flange and a second flange of said pair of mating flanges comprises a pipe flange.

3. The valve assembly of claim 1, wherein a first flange of said pair of mating flanges comprises a valve flange and a second flange of said pair of mating flanges comprises a valve flange of another different valve.

4. The valve assembly of claim 1, wherein said coupling comprises a grooved coupling.

5. The valve assembly of claim 1, comprising the safety wire passing freely through said unobstructed through hole, wherein said at least one hollow bolt comprises two or more hollow bolts.

6. The valve assembly of claim 1, wherein said non-taut safety wire is looped at least once through said at least one hollow bolt to form a non-taut safety wire loop.

7. The valve assembly of claim 6, comprising an inspection tag having a tag hole, said non-taut safety wire loop passed through said tag hole.

8. The valve assembly of claim 1, wherein a first flange of said pair of mating flanges comprises a valve flange and a second flange of said pair of mating flanges comprises a valve flange of another different valve.

9. A valve assembly comprising:

at least one valve of said valve assembly mechanically coupled to a pipe or to a section of another component of said valve assembly by a coupling or by a pair of mating flanges;

at least one hollow bolt comprising an unobstructed through hole, said at least one hollow bolt bolted through a closing bolt hole of said coupling or a joining bolt hole of said pair of mating flanges, said at least one hollow bolt to slidingly accept a safety wire inspection marking run completely through said at least one hollow bolt in a longitudinal direction of said hollow bolt and extending completely through said closing bolt hole of said coupling or said joining bolt hole of said pair of mating flanges, the safety wire inspection marking to extend beyond both longitudinal ends of said at least one hollow bolt; and a non-taut safety wire inspection marking passing freely through said unobstructed through hole.

10. The valve assembly of claim 9, wherein said non-taut safety wire inspection marking is looped at least once through said at least one hollow bolt to form a non-taut safety wire inspection marking loop.

11. The valve assembly of claim 10, comprising an inspection tag having a tag hole, said non-taut safety wire inspection marking loop passed through said tag hole.

12. The valve assembly of claim 9, wherein a first flange of said pair of mating flanges comprises a valve flange and a second flange of said pair of mating flanges comprises a pipe flange.

13. The valve assembly of claim 9, wherein said coupling comprises a grooved coupling.

14. The valve assembly of claim 9, wherein said at least one hollow bolt comprises two or more hollow bolts.

\* \* \* \* \*